US008462820B2

(12) United States Patent
Varier et al.

(10) Patent No.: US 8,462,820 B2
(45) Date of Patent: *Jun. 11, 2013

(54) NETWORK TRAFFIC SYNCHRONIZATION MECHANISM

(75) Inventors: Roopesh R. Varier, Sunnyvale, CA (US); David Jacobsen, Durham, NC (US); Guy Riddle, Los Gatos, CA (US)

(73) Assignee: Blue Coat Systems, Inc., Sunnyale, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 12/854,153

(22) Filed: Aug. 10, 2010

(65) Prior Publication Data

US 2011/0103407 A1 May 5, 2011

Related U.S. Application Data

(63) Continuation of application No. 12/046,089, filed on Mar. 11, 2008, now Pat. No. 7,773,530, which is a continuation of application No. 10/611,573, filed on Jun. 30, 2003, now Pat. No. 7,366,101.

(51) Int. Cl.
*H04L 12/28* (2006.01)
*H04L 12/56* (2006.01)
*H04J 3/14* (2006.01)
*H04J 3/06* (2006.01)

(52) U.S. Cl.
USPC ......... 370/503; 370/241.1; 370/329; 370/401

(58) Field of Classification Search
USPC ................. 370/216–522; 375/225; 714/18, 714/748
See application file for complete search history.

(56) References Cited

U.S. PATENT DOCUMENTS

| 5,802,106 | A | * | 9/1998 | Packer | 375/225 |
|---|---|---|---|---|---|
| 6,456,630 | B1 | * | 9/2002 | Packer et al. | 370/466 |
| 7,013,342 | B2 | * | 3/2006 | Riddle | 709/230 |
| 7,032,072 | B1 | * | 4/2006 | Quinn et al. | 711/118 |
| 7,366,101 | B1 | * | 4/2008 | Varier et al. | 370/241 |
| 7,406,522 | B2 | * | 7/2008 | Riddle | 709/226 |
| 7,433,304 | B1 | * | 10/2008 | Galloway et al. | 370/229 |
| 7,773,530 | B2 | * | 8/2010 | Varier et al. | 370/241 |
| 2003/0043792 | A1 | * | 3/2003 | Carpini et al. | 370/386 |
| 2003/0053493 | A1 | * | 3/2003 | Graham Mobley et al. | 370/538 |
| 2011/0213869 | A1 | * | 9/2011 | Korsunsky et al. | 709/223 |

* cited by examiner

*Primary Examiner* — Afsar M. Qureshi
(74) *Attorney, Agent, or Firm* — Baker Botts L.L.P.

(57) ABSTRACT

Methods, apparatuses and systems directed to a network traffic synchronization mechanism facilitating the deployment of network devices in redundant network topologies. In certain embodiments, when a first network device directly receives network traffic, it copies the network traffic and transmits it to at least one partner network device. The partner network device processes the copied network traffic, just as if it had received it directly, but, in one embodiment, discards the traffic before forwarding it on to its destination. In one embodiment, the partner network devices are operative to exchange directly received network traffic. As a result, the present invention provides enhanced reliability and seamless failover. Each unit, for example, is ready at any time to take over for the other unit should a failure occur. As discussed below, the network traffic synchronization mechanism can be applied to a variety of network devices, such as firewalls, gateways, network routers, and bandwidth management devices.

6 Claims, 12 Drawing Sheets

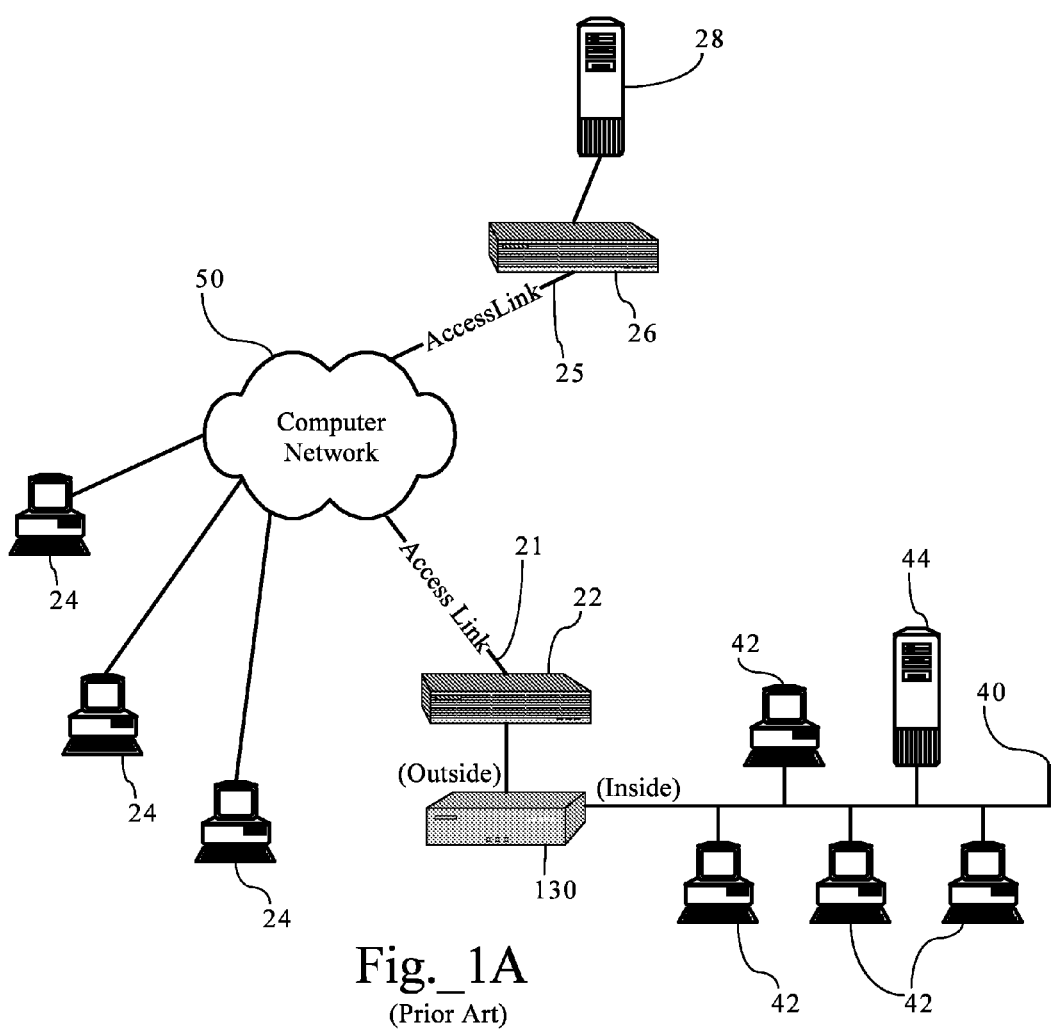
Fig._1A
(Prior Art)

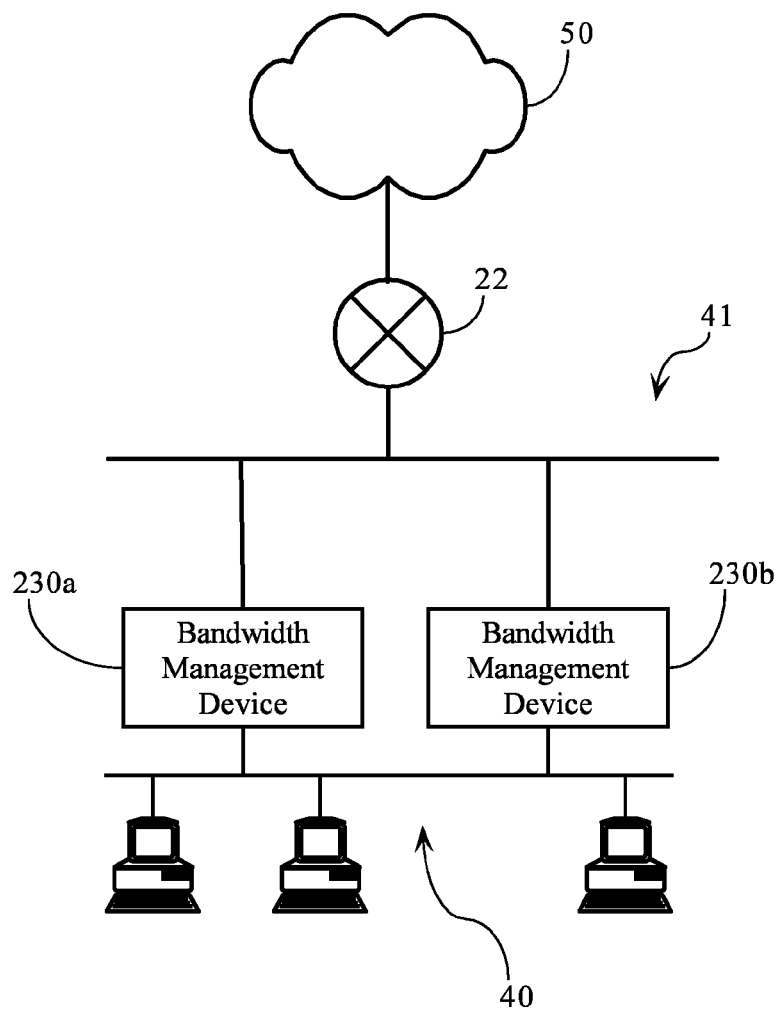
Fig._1B
(Prior Art)

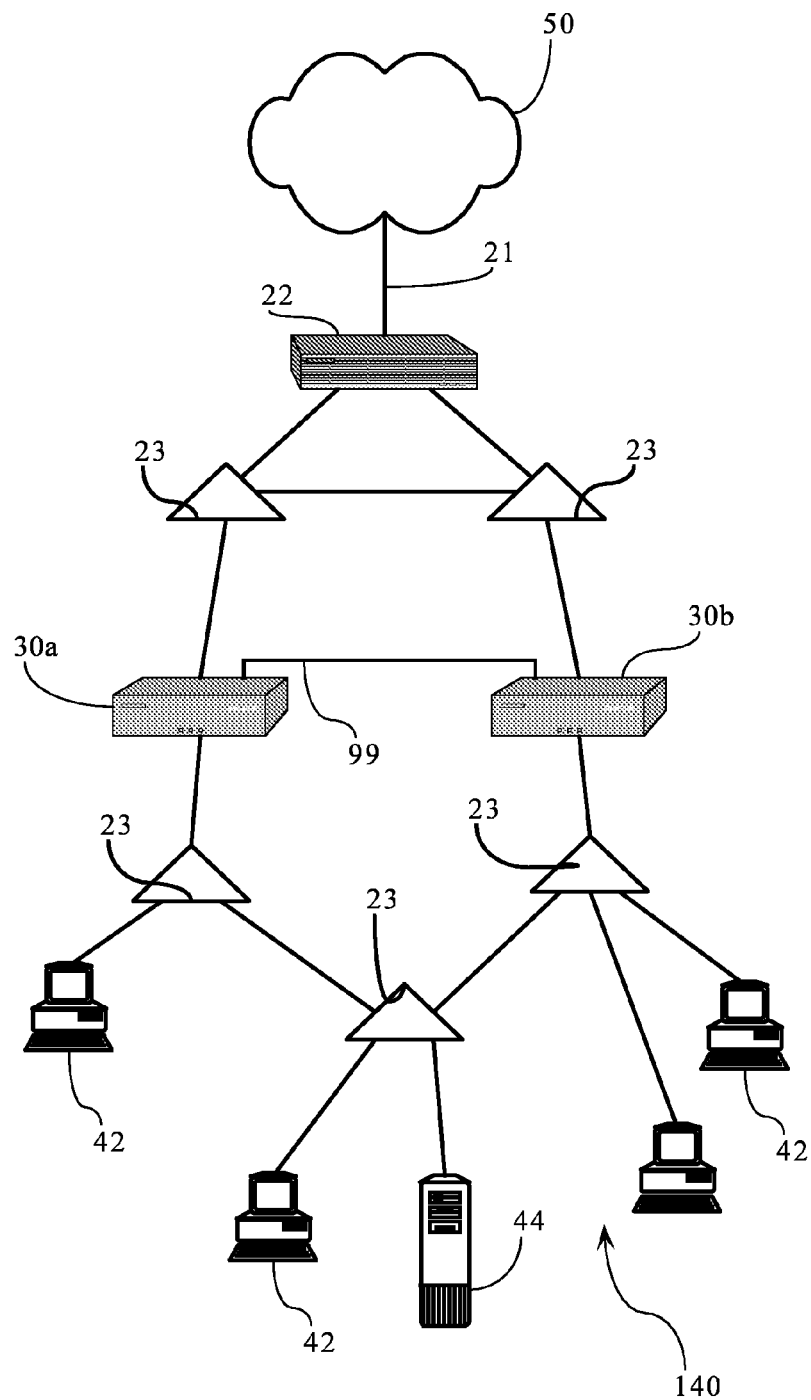
Fig._2A

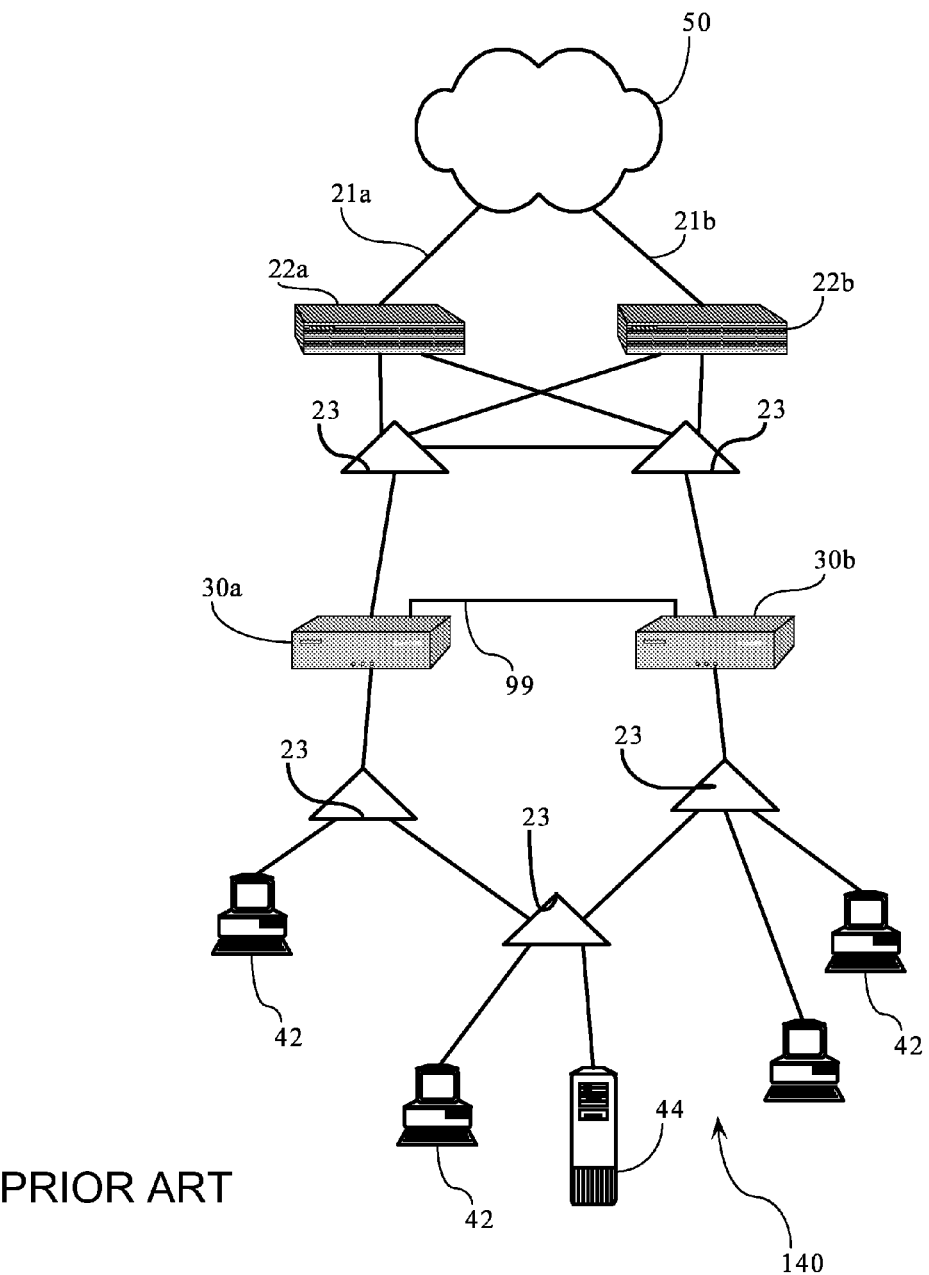
PRIOR ART
Fig._2B

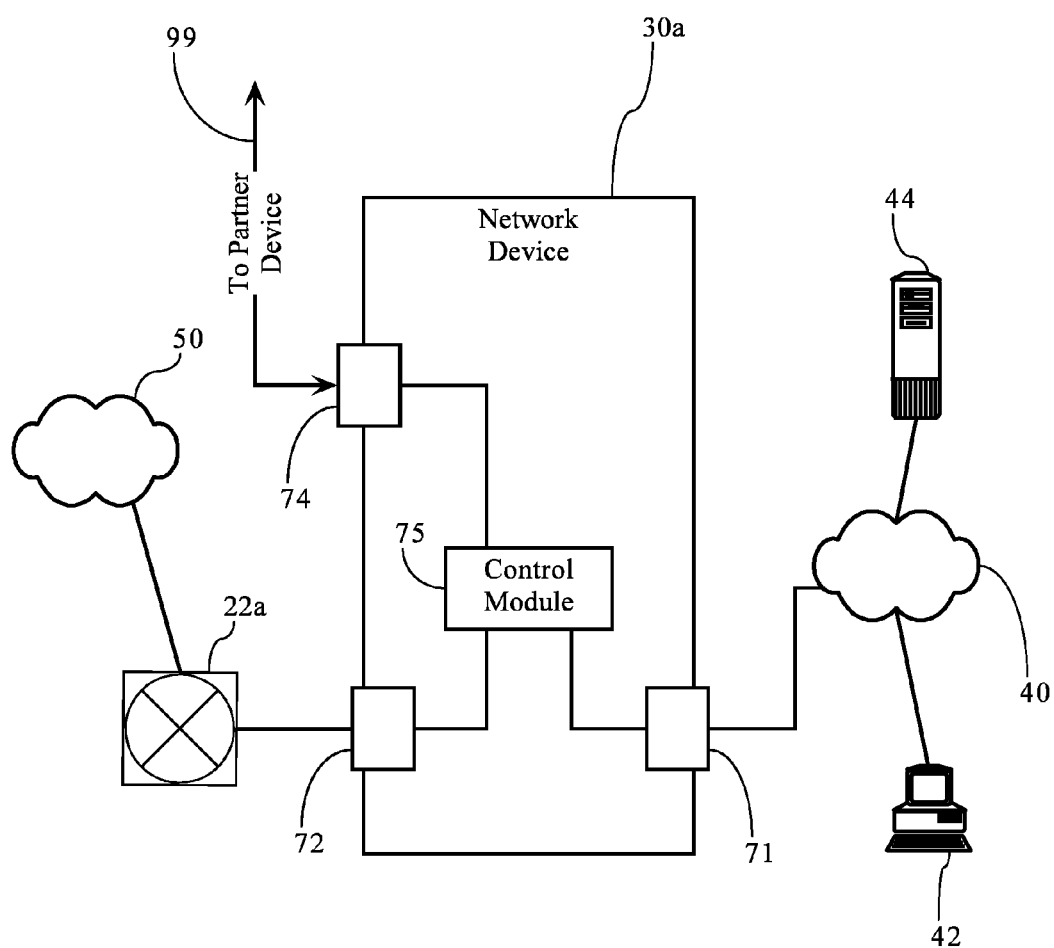
Fig._2C

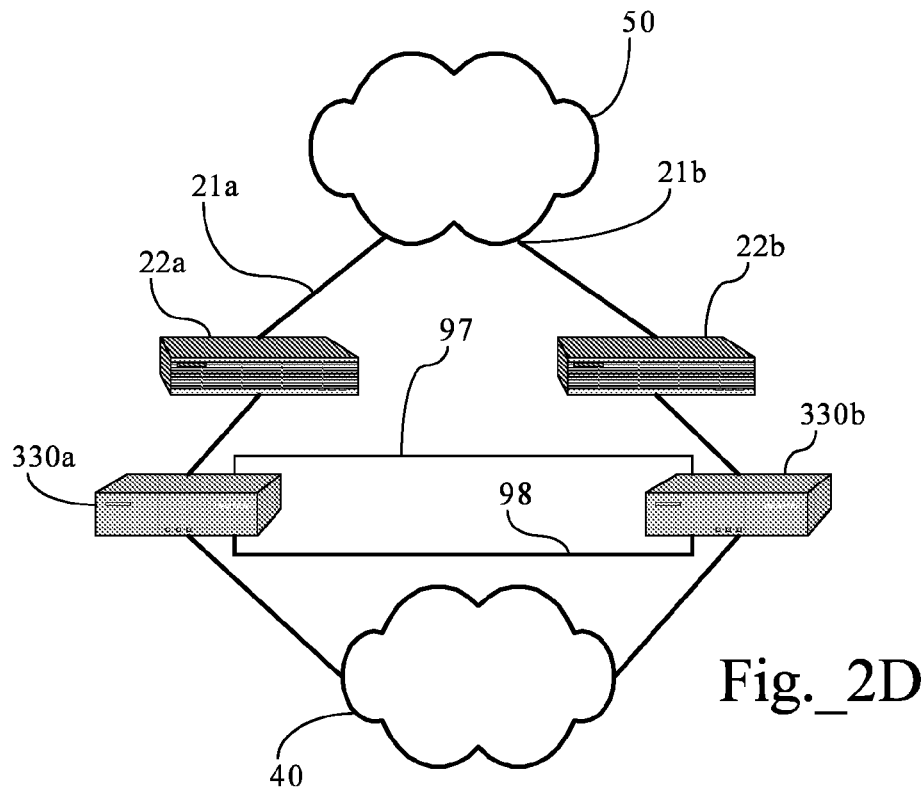
Fig._2D
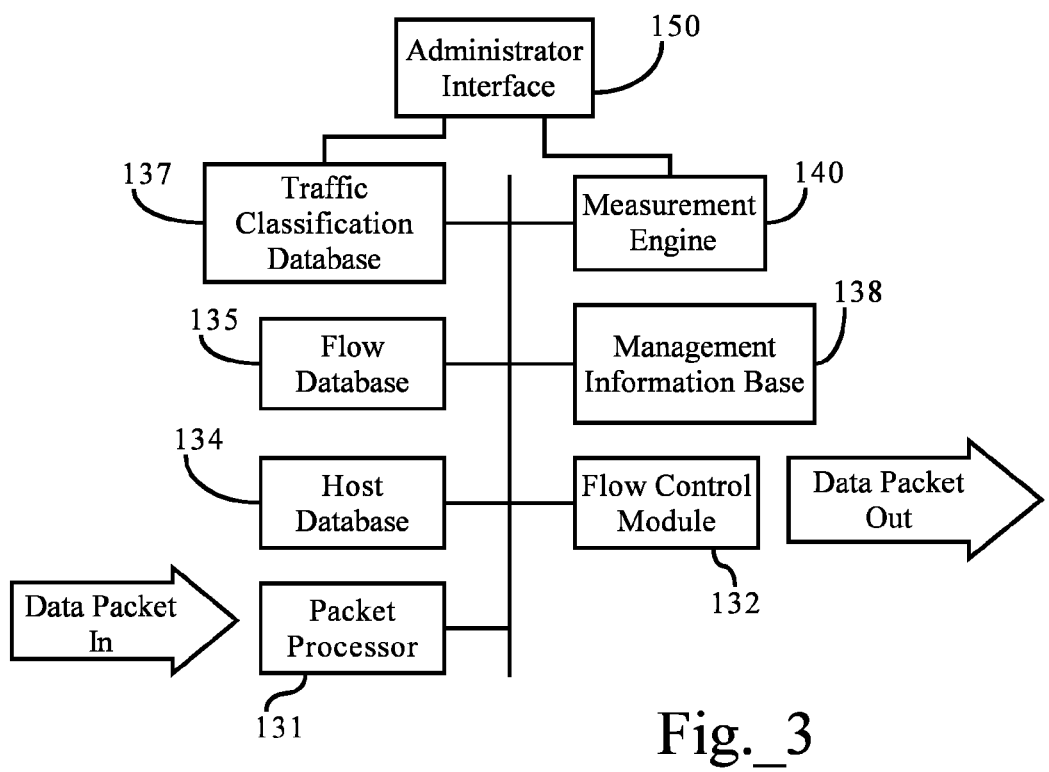
Fig._3

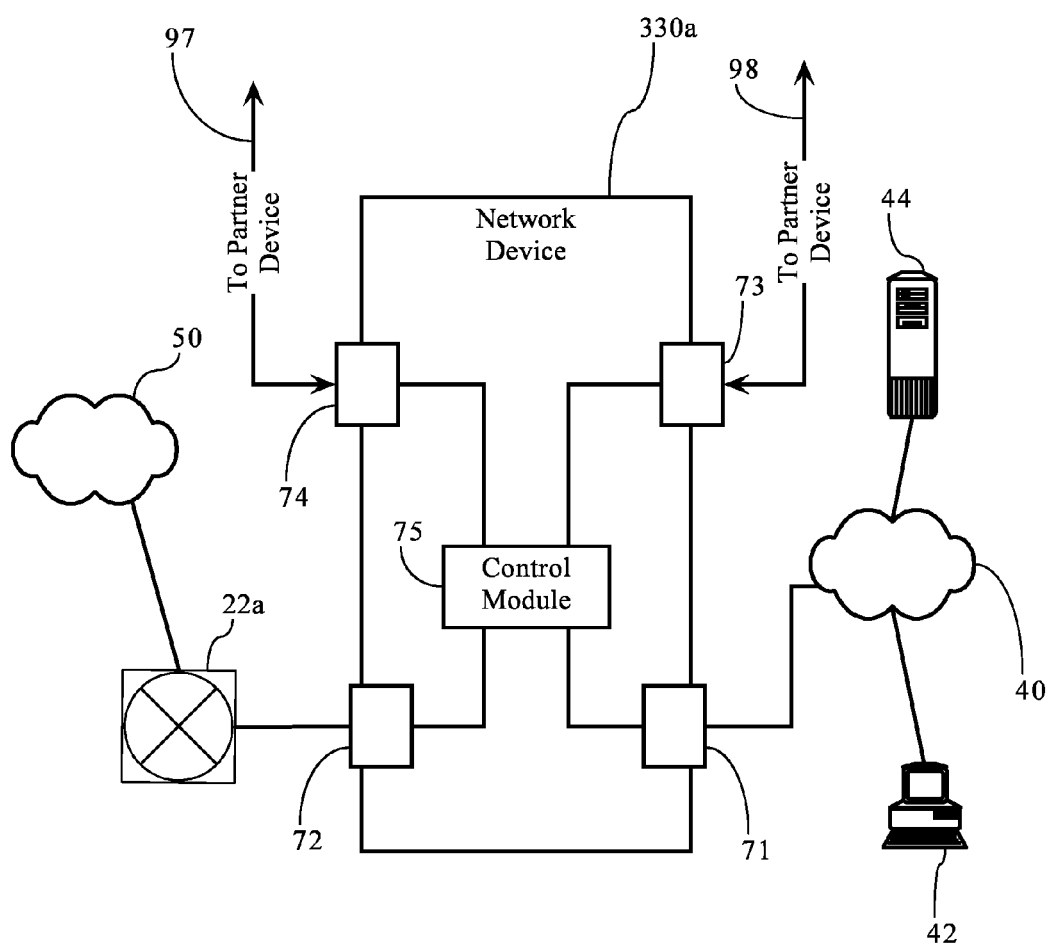
Fig._2E

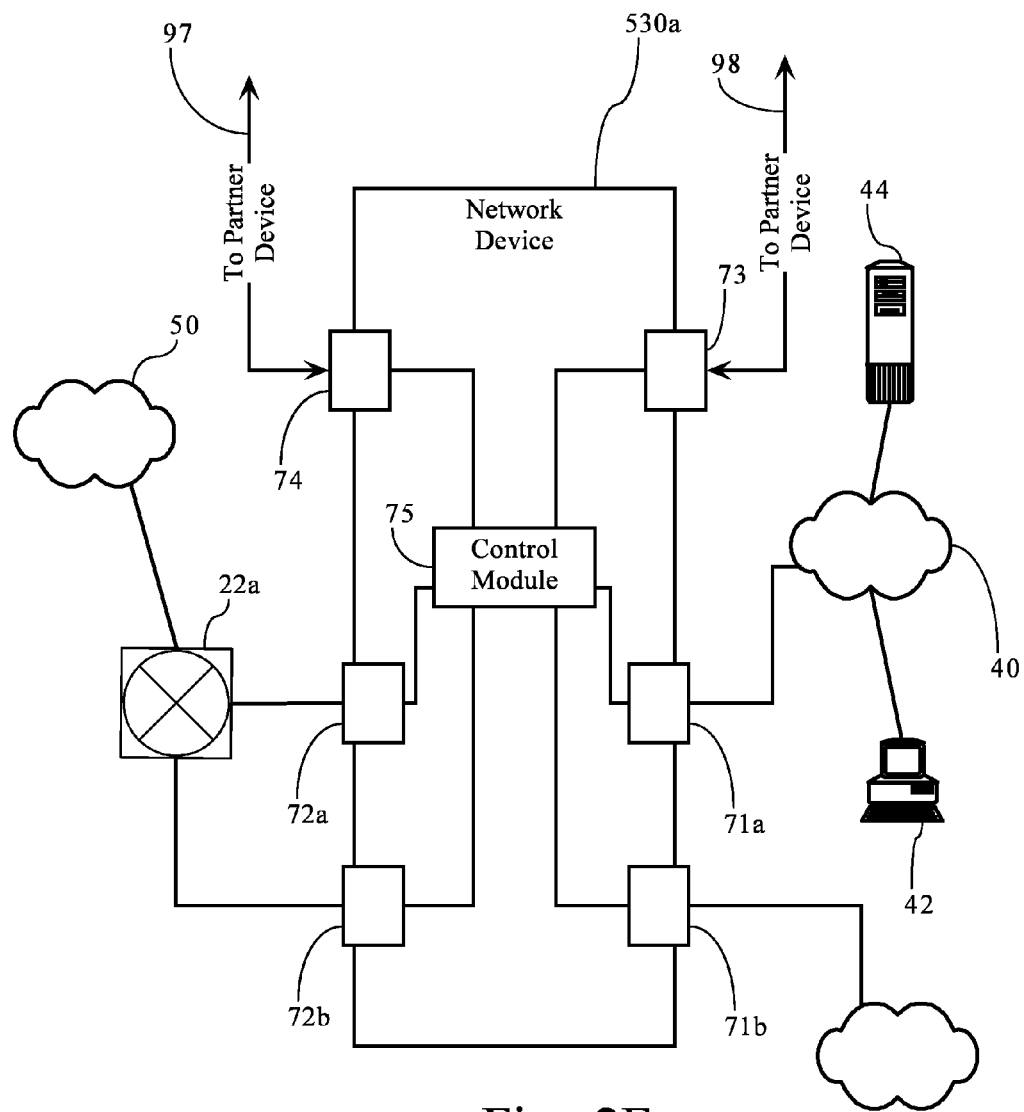
Fig. _2F

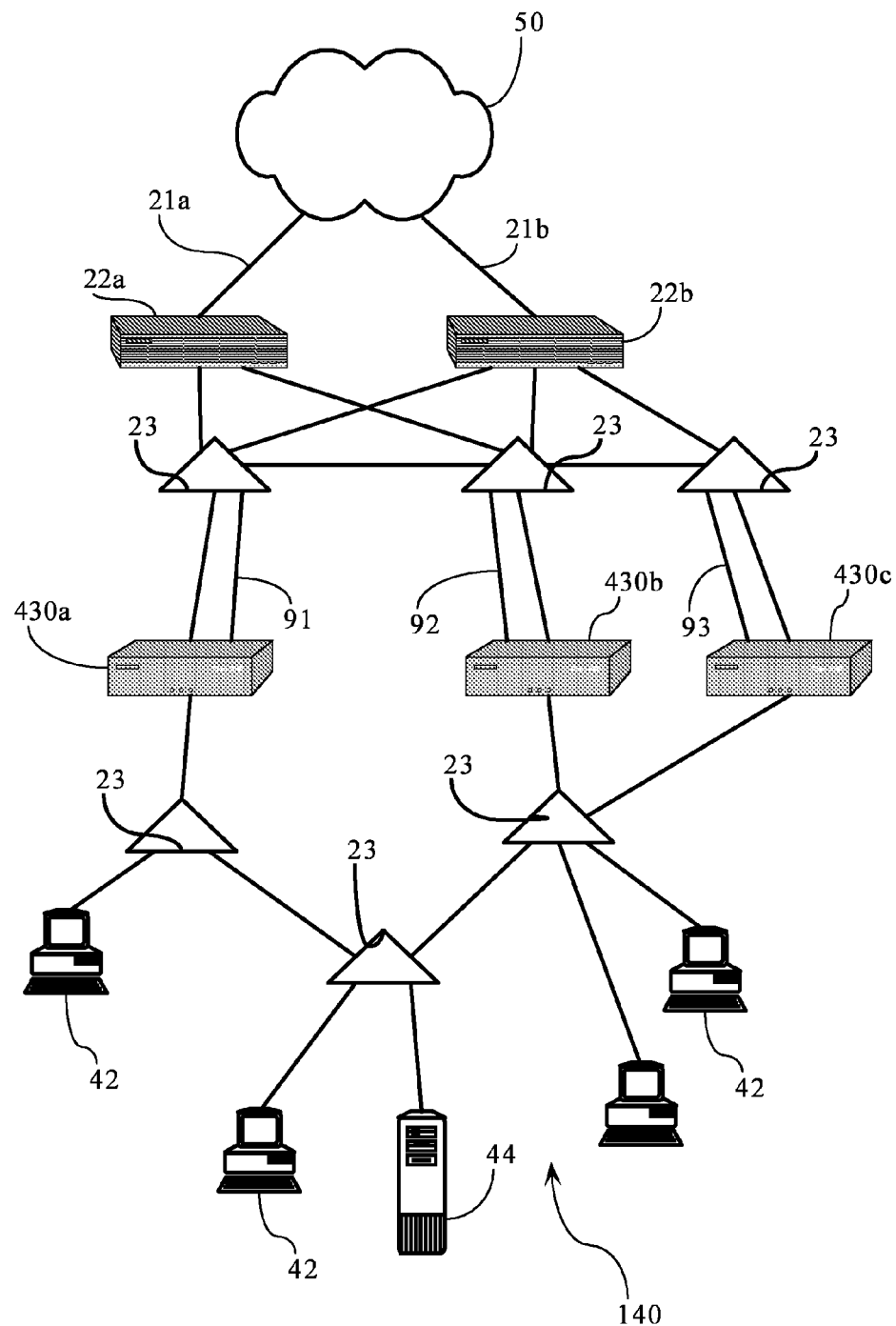
Fig._2G

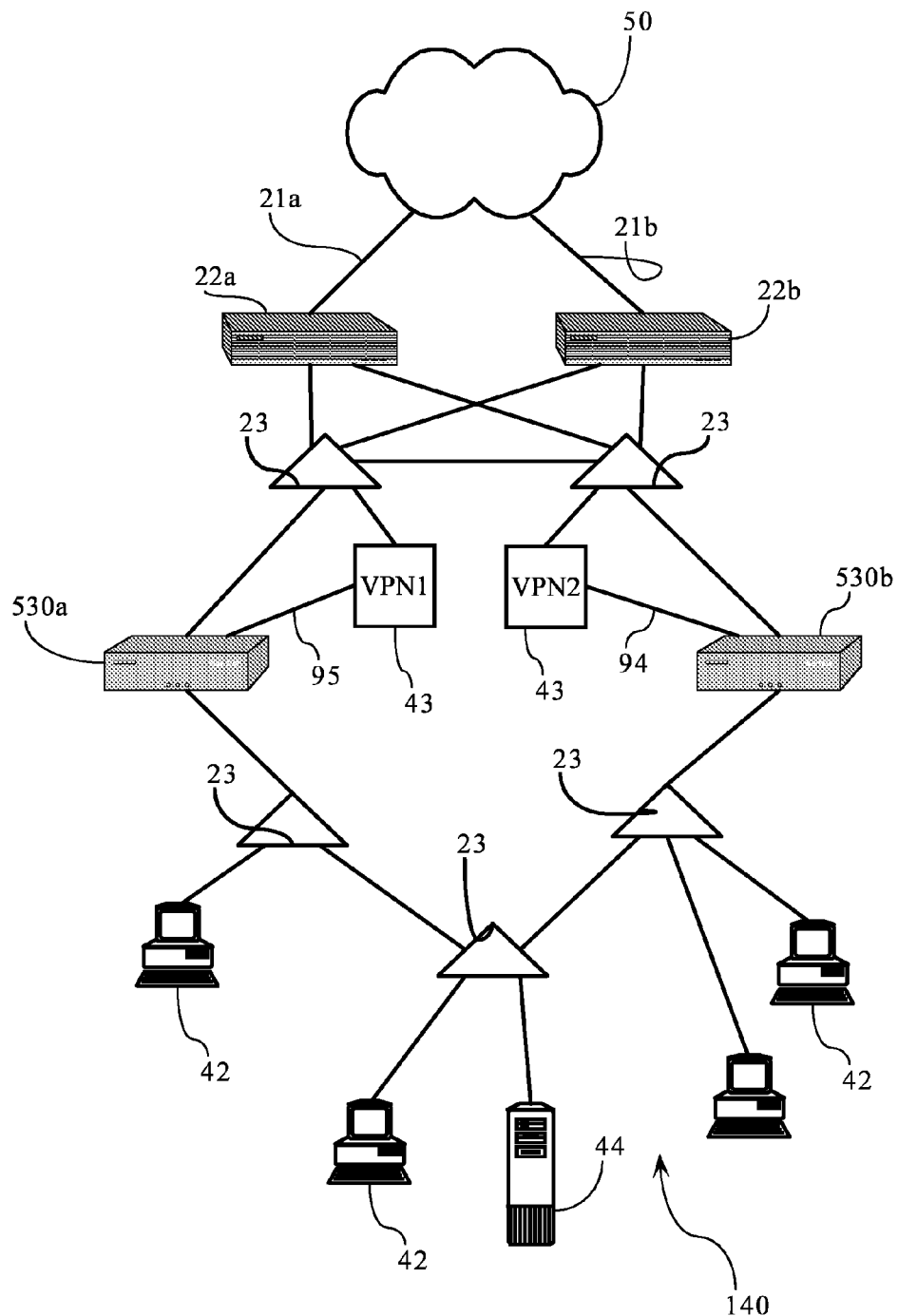
Fig._2H

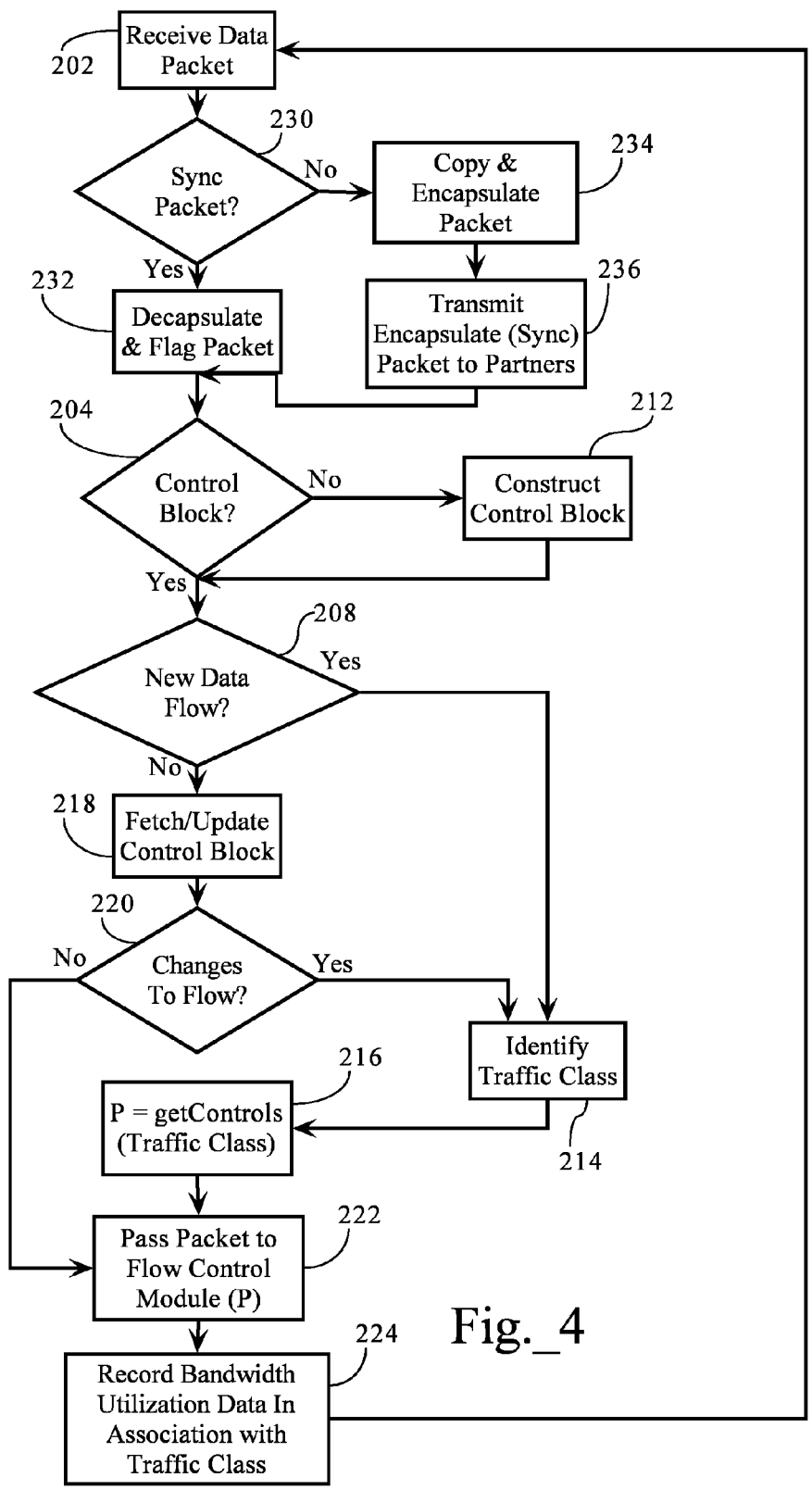
Fig._4

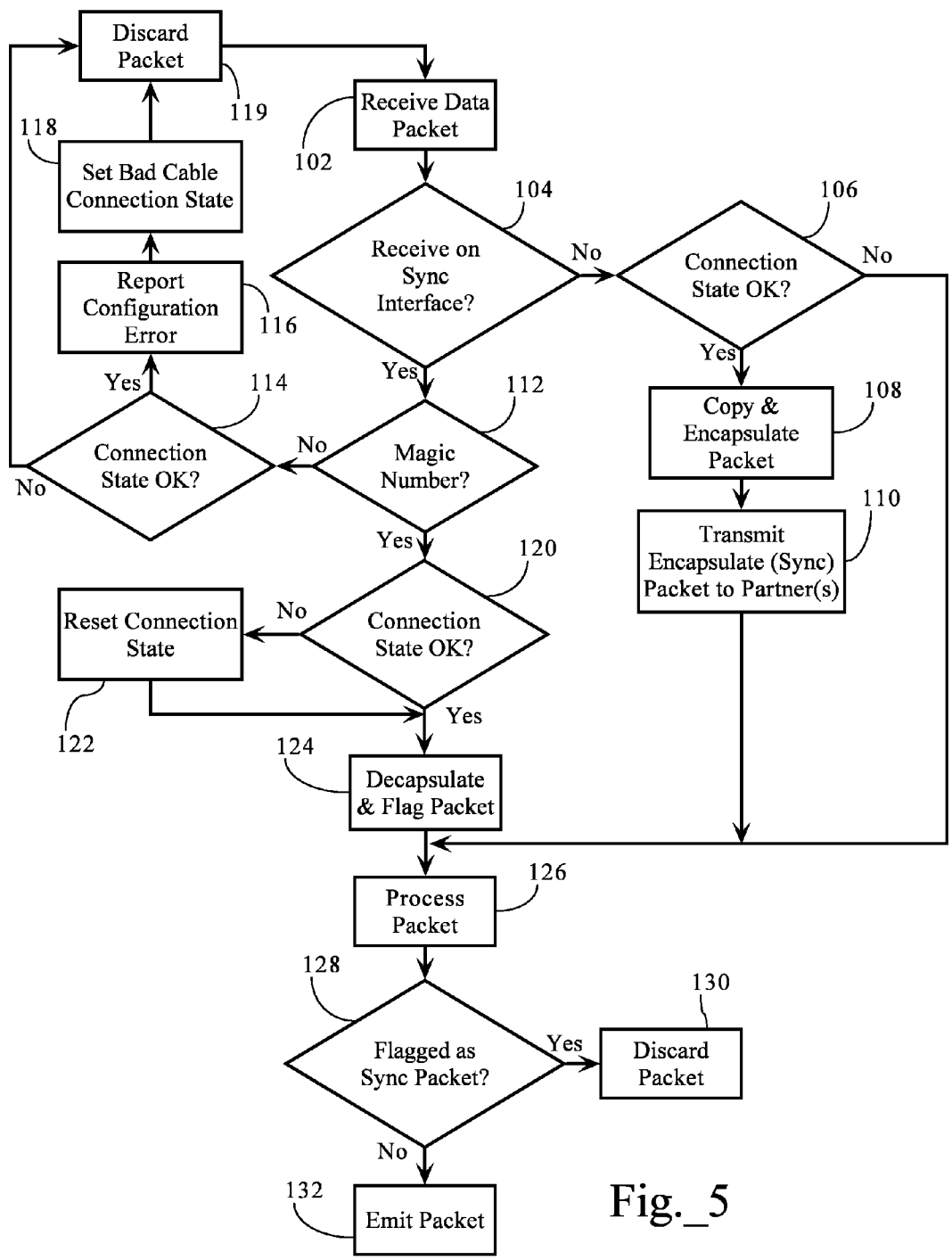
Fig._5

NETWORK TRAFFIC SYNCHRONIZATION MECHANISM

CROSS-REFERENCE TO RELATED APPLICATIONS

This application is a continuation of U.S. application Ser. No. 12/046,089, filed Mar. 11, 2008, which issued as U.S. Pat. No. 7,773,530 on Aug. 10, 2010, which is incorporated herein by reference for all purposes. U.S. application Ser. No. 12/046,089 is a continuation of U.S. Ser. No. 10/611,573, filed Jun. 30, 2003, which issued as U.S. Pat. No. 7,366,101 on Apr. 29, 2008, which is also incorporated herein by reference for all purposes.

This application also makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/966,538, in the name of Guy Riddle, entitled "Dynamic Partitioning of Network Resources;"

U.S. patent application Ser. No. 10/039,992, in the Michael J. Quinn and Mary L. Laier, entitled "Method and Apparatus for Fast Lookup of Related Classification Entities in a Tree-Ordered Classification Hierarchy;"

U.S. patent application Ser. No. 10/015,826, in the name of Guy Riddle, entitled "Dynamic Tunnel Probing in a Communications Network;"

U.S. patent application Ser. No. 10/104,238, in the name of Robert Purvy and Mark Hill, entitled "Methods and Systems Allowing for Non-Intrusive Network Management;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936, in the name of Guy Riddle, Robert L. Packer and Mark Hill, entitled "Method for Automatically Classifying Traffic with Enhanced Hierarchy in a Packet Communications Network;"

U.S. patent application Ser. No. 10/177,518, in the name of Guy Riddle, entitled "Methods, Apparatuses and Systems Allowing for Progressive Network Resource Utilization Control Scheme;"

U.S. patent application Ser. No. 10/178,617, in the name of Robert E. Purvy, entitled "Methods, Apparatuses and Systems Facilitating Analysis of Network Device Performance;" and U.S. patent application Ser. No. 10/236,149, in the name of Brett Galloway and George Powers, entitled "Classification Data Structure enabling Multi-Dimensional Network Traffic Classification and Control Schemes."

FIELD OF THE INVENTION

The present invention relates to computer networks and, more particularly, to methods, apparatuses and systems facilitating the synchronization of monitoring and/or management tasks associated with network devices deployed in redundant network topologies.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. Patents and patent applications provide explanations of certain technical aspects of a packet based telecommunications network environment, such as Internet/Intranet technology based largely on the TCP/IP protocol suite, and describe the deployment of bandwidth management solutions to monitor and manage network environments using such protocols and technologies.

An important aspect of implementing enterprise-grade network environments is provisioning mechanisms that address or adjust to the failure of systems associated with or connected to the network environment. For example, FIG. 1A illustrates a computer network environment including a bandwidth management device 130 deployed to manage network traffic traversing an access link 21 connected to a open computer network 50, such as the Internet. As one skilled in the art will recognize the failure of bandwidth management device 130 will prevent the flow of network traffic between end systems connected to LAN 40 and computer network 50. To prevent this from occurring, one prior art mechanism is to include a relay that actuates a switch to create a direct path for electrical signals across the bandwidth management device 130, when a software or hardware failure disables bandwidth management device 130. In this manner, the bandwidth management device 130 essentially acts as a wire, allowing network traffic to pass to thereby preserve network access. The problem with this approach is that, while network access is preserved, there is no failover mechanism to control or optimize network traffic while the bandwidth management device 130 remains down.

To provide failover support that addresses this circumstance, the prior art included a "hot standby" mechanism offered by Packeteer, Inc. of Cupertino, Calif., for use in shared Ethernet network environments employing the Carrier Sense Multiple Access with Collision Detection (CSMA/CD) protocol. As FIG. 1B illustrates, redundant bandwidth management devices 230a, 230b are deployed between router 22 and LAN 40. The inherent properties of the shared Ethernet LANs 40 and 41 meant that all inbound and outbound packets were received at both bandwidth management devices 230a, 230b. According to the hot standby mechanism, one bandwidth management device 230a (for instance) operated in a normal mode classifying and shaping network traffic, while the other bandwidth management device 230b operated in a monitor-only mode where the packets were dropped before egress from the device. The bandwidth management devices 230a, 230b were also configured to communicate with each other over LAN 40 and/or 41 to allow each device to detect when the other failed. When such a failure occurred, bandwidth management device 230b previously operating in a monitor-only mode, could provide failover support in a substantially seamless fashion since its data structures were already populated with the information required to perform its function.

While the hot standby feature is suitable in shared Ethernet environments, the use of Ethernet LAN switches in more modern enterprise networks has presented further challenges. According to switched Ethernet environments, an end system only sees the packets intended for it, rendering invalid the assumption upon which the hot standby mechanism is based. FIG. 2A illustrates a computer network environment implemented by LAN switches 23, where the end systems such as computers 42 and servers 44 are connected to different ports of a LAN switch 23. In the network environment of FIG. 2A, LAN switches 23 connect bandwidth management devices 30a, 30b to router 22, as well as the end systems associated with an enterprise network. While the bandwidth management devices 30a, 30b are deployed in a redundant topology, without the present invention, there is no mechanism that ensures that one device can seamlessly take over for the other device should one fail.

Furthermore, many enterprise network architectures feature redundant topologies for such purposes as load-sharing and failover. For example, as FIG. 2B illustrates a typical enterprise network infrastructure may include a plurality of access links (e.g., 21a, 21b) connecting an enterprise LAN or WAN to an open computer network 50. In these network topologies, network traffic may be directed completely through one route or may be load-shared between alternative routes. According to these deployment scenarios, a given bandwidth management device 30a or 30b during a given span of time may see all network traffic, part of the network traffic, or no network traffic. This circumstance renders control of network traffic on a network-wide basis problematic, especially when the bandwidth management devices 30a, 30b each encounter only part of the network traffic. That is, each bandwidth management device 30a, 30b, without the invention described herein, does not obtain enough information about the network traffic associated with the entire network to be able to accurately monitor network traffic and make intelligent decisions to control or shape the network traffic flowing through the corresponding access links 21a, 21b. In addition, if a given bandwidth management device 30a, 30b sees no traffic for a period of time and the active route fails (for example), the bandwidth management device deployed on the alternate route essentially becomes the master controller but possesses no prior information about existing flows or other network statistics. This circumstance often renders it impossible to adequately classify data flows associated with connections active at the time of a change or failover in the active bandwidth management device.

In light of the foregoing, a need in the art exists for methods, apparatuses, and systems that allow two or more network devices to synchronize as to network traffic individually encountered by each network device. A need further exists for methods, apparatuses and systems facilitating the monitoring and management of network traffic in redundant network topologies. Embodiments of the present invention substantially fulfill these needs.

SUMMARY OF THE INVENTION

The present invention provides methods, apparatuses and systems directed to a network traffic synchronization mechanism facilitating the deployment of network devices in redundant network topologies. In certain embodiments, when a first network device directly receives network traffic, it copies the network traffic and transmits it to at least one partner network device. The partner network device processes the copied network traffic, just as if it had received it directly, but, in one embodiment, discards the traffic before forwarding it on to its destination. In one embodiment, the partner network devices are operative to exchange directly received network traffic. As a result, the present invention provides enhanced reliability and seamless failover. Each unit, for example, is ready at any time to take over for the other unit should a failure occur. As discussed below, the network traffic synchronization mechanism can be applied to a variety of network devices, such as firewalls, gateways, network routers, and bandwidth management devices.

DESCRIPTION OF THE DRAWINGS

FIG. 1A is a functional block diagram illustrating a computer network environment including a bandwidth management device deployed in a non-redundant network environment including a single access link.

FIG. 1B is a functional block diagram showing the deployment of redundant network devices in a CSMA/CD network environment.

FIG. 2A is a functional block diagram illustrating a computer network environment including first and second network devices 30a, 30b and LAN switches 23.

FIG. 2B is a functional block diagram illustrating a computer network environment including first and second network devices 30a, 30b deployed to control traffic across redundant access links 21a, 21b.

FIG. 2C is a functional block diagram illustrating the network interfaces and other functionality associated with a network device configured according to an embodiment of the present invention.

FIG. 2D is a functional block diagram illustrating an alternative connection scheme between the first and second network devices for the exchange of network traffic synchronization data.

FIG. 2E is a functional block diagram illustrating the network interfaces and other functionality associated with a network device configured according to another embodiment of the present invention.

FIG. 2F is a functional block diagram illustrating the functionality associated with a network device including third and fourth non-synchronization network interfaces.

FIG. 2G is a functional block diagram illustrating a computer network environment including first, second and third network devices 430a, 430b and 430c deployed to control traffic across redundant access links 21a, 21b.

FIG. 2H is a functional block diagram illustrating a computer network environment including network devices connected to Virtual Private Network servers.

FIG. 3 is a functional block diagram setting forth the functionality in a bandwidth management device according to an embodiment of the present invention.

FIG. 4 is a flow chart diagram illustrating a method directed to the synchronization of network traffic data and the enforcement of bandwidth utilization control on network traffic data traversing an access link.

FIG. 5 is a flow chart diagram illustrating a method directed to the synchronization of network traffic between two or more network devices.

DESCRIPTION OF PREFERRED
EMBODIMENT(S)

FIGS. 2A and 2B illustrate two possible network environments in which embodiments of the present invention may operate. FIG. 2A illustrates a computer network environment where access link 21 and router 22 connect LAN 40 to computer network 50. As FIG. 2A shows, the network environment includes redundant network devices 30a, 30b operatively connected to communication paths between LAN 40 and router 22 via LAN switches 23. FIG. 2B illustrates a computer network environment featuring a redundant network topology, that includes first and second access links 21a, 21b; routers 22a, 22b; and network devices 30a, 30b. Access links 21a, 21b operably connect computer network 140 to computer network 50. In one embodiment, computer network 140 is an enterprise WAN comprising a plurality of LAN segments. In one embodiment, computer network 50 is an open computer network, such as the Internet. As one skilled in the art will recognize, the network topology can be expanded to include additional access links and associated network devices. LAN switches 23 include a plurality of ports to which end systems, such as client computers 42 and servers 44, and intermediate systems, such as routers and other switches, are connected. LAN switches 23 receive packets on a given port and forward the packets to other network devices on selected ports. In one embodiment, LAN switch 23 is an Ethernet-based (IEEE 802.3) switch.

A. Packet Synchronization Functionality

As discussed above, FIG. 2A sets forth a packet-based computer network environment including network devices 30a, 30b deployed to perform a network function on data flows traversing access links 21. In the network environment of FIG. 2B network devices 30a, 30b by operation of LAN switches 23 are operative to perform a network function on data flows traversing access links 21a, 21b respectively. As FIG. 2A shows, computer network 140 interconnects several TCP/IP end systems, including client devices 42 and server device 44, and provides access to resources operably connected to computer network 50 via router 22. Access link 21 is a physical and/or logical connection between two networks, such as computer network 50 and network 140. The computer network environment, including computer networks 140, 50 is a packet-based communications environment, employing TCP/IP protocols, and/or other suitable protocols, and has a plurality of interconnected digital packet transmission stations or routing nodes. As FIG. 2A illustrates, network devices 30a, 30b, in one embodiment, are provided between router 22, respectively, and computer network 140. As discussed in more detail below, network devices 30a, 30b, can be bandwidth management devices that are each operative to classify data flows and, depending on the classification, enforce respective bandwidth utilization controls on the data flows to control bandwidth utilization across and optimize network application performance across access links 21. In the network environment of FIG. 2A, bandwidth management device 30b, in one embodiment, may be deployed solely to provide failover support in case of the failure of bandwidth management device 30a. Other operational configurations, however, are possible. In the network environment of FIG. 2B, bandwidth management devices 30a, 30b may operate concurrently to control bandwidth utilization across respective access links 21a, 21b with one unit able to seamless take over for the other should either unit itself, a LAN switch 23, a router 22a or 22b, and/or access links 21a or 21b fail. In such an embodiment, LAN switches 23 include the capability or re-directing traffic to alternate ports upon the detection of a network failure.

Network devices 30a, 30b are operably connected to transmit packet data to synchronize network traffic between each other. As the following provides, network devices 30a, 30b can be connected to synchronize network traffic in a variety of configurations. As FIGS. 2A and 2B illustrate, transmission line 99 interconnects network devices 30a, 30b to allow for sharing of network traffic data in the form of synchronization packets. FIG. 2C further illustrates the configuration of network device 30a according to an embodiment of the present invention. As FIG. 2C shows, network device 30a comprises control module 75, and, in one embodiment, network interfaces 71, 72, and synchronization network interface 74. As FIG. 2C illustrates, network interfaces 71 and 72 operably connect network device 30a to the communications path between computer network 140 and router 22a and are the interfaces at which regular network traffic is received. Synchronization network interface 74 connects network device 30a, via transmission line 99, to one or more partner network devices, such as network device 30b. In one embodiment, all synchronization packets whether arriving at network interface 71 or network interface 72 are exchanged over network interface 74. In one such embodiment, the interface at which the packet arrived is indicated in a reserved header field in the synchronization header encapsulating the copied packet. As discussed below, in another embodiment not using synchronization headers, the network interface identifier overwrites a portion of the copied packet data. In another embodiment, the packet flow direction can be determined by examining the host database 134 containing the inside and outside host IP addresses (see below).

Network devices 30a, 30b may be connected via network interface 74 in a variety of manners. As discussed above, network interfaces 74 of network devices 30a, 30b may be connected via a direct line, such as a CAT-5 cable. In one embodiment, network interface 74 is a wired Ethernet-based interface. In another embodiment, network interface 74 may be a wireless network interface allowing for wireless transmission of synchronization packets between network devices 30a and 30b. In such an embodiment, the synchronization packets are preferably encrypted to guard against unauthorized detection or analysis of the network traffic. In another embodiment, network interface 74 may be directly connected to computer network 140 to allow for transmission of copied packets over computer network 140. In such an embodiment, the copied packets are encapsulated in synchronization headers (see below) to allow LAN switch 23 or other network device to transmit the synchronization packets to the proper destination.

In another embodiment, network interface 73 may also be used as a synchronization interface that connects network device 30a, via a direct transmission line or indirect connection (e.g., through computer network 140), to one or more partner network devices, such as network device 30b for the exchange of synchronization packets. See FIGS. 2D and 2E. Such an embodiment allows regular network interfaces 71 or 72 to be paired with a synchronization interface 73 or 74 to obviate the need for flagging or explicitly determining the interface at which the packet was received. As FIG. 2E illustrates, assuming network interface 73 is used as a synchronization interface, network interface 73 can be directly connected to a corresponding synchronization interface on a partner network device via transmission line 98. As FIGS. 2D and 2E illustrate, synchronization network interface 74 of network device 330a is connected to a corresponding network interface on a partner network device 330b via transmission line 98. Alternatively, network interface 73 and/or network interface 74 may be connected to computer network 140 such that copied packets are transmitted over computer network 140 between network devices 30a, 30b. Connecting the synchronization interfaces over a LAN or other computer network supporting regular network traffic, however, requires encapsulation of the packets with the appropriate MAC or other network address to ensure that they reach their intended destination. Such a configuration, however, allows synchronization packets to be multicast (or broadcast in a VLAN) to more than one partner network device to allow for synchronization of more than two network devices. As FIG. 2G illustrates, in embodiments involving more than two partner network devices 430a, 430b, 430c, the synchronization interfaces 74 may be connected to a computer network via lines 91, 92, and 93. In the embodiment shown including LAN switches 23, the synchronization packets require encapsulation and the use of a multicast MAC address to ensure that each synchronization interface 74 receives all synchronization packets. In one embodiment, the synchronization network interfaces may be connected to the same virtual Local Area Network (VLAN) to facilitate layer 2 discovery mechanisms and the automatic configuration of network devices for the transmission of synchronization packets. In one embodiment, synchronization packets may then be broadcast or multicast to all the network devices in the VLAN. In another embodiment, the synchronization interfaces 74 of network devices 430a, 430b, 430c can be connected to an Ethernet hub obviating the need to encapsulate the packets and/or use a multicast MAC address, since a given synchronization interface will, by operation of the hub, see the packets sent from the other two interfaces.

In yet another embodiment, VPN servers or similar functionality may be employed to tunnel and encrypt the synchronization packets transmitted between network devices. For example, network devices 530a and 530b are connected to VPN servers 43 via transmission lines 94, 95 (see FIG. 2H). In such an embodiment, VPN servers 43 (labeled, VPN 1 and VPN 2) encrypt and tunnel the synchronization packets between network devices 530a, 530b. In yet another embodiment, all regular network traffic and the synchronization packets can be transmitted over transmission lines 94, 95 and through VPN servers 43, obviating the second connections between network devices 530a, 530b and LAN switches 23. Furthermore, VPN functionality could also be implemented across transmission line 99 between network devices 30a, 30b (see FIG. 2B).

Control module 75 generally refers to the functionality implemented by intermediate network device 30. In one embodiment, control module 75 is a combination of hardware and software, such as a central processing unit, memory, a system bus, an operating system and an application, such as a firewall, gateway, proxy, or bandwidth management application. In one embodiment, network interfaces 71, 72, 73 and 74 are implemented as a combination of hardware and software, such as network interface cards and associated software drivers. In addition, the network interfaces 71, 72, 73 and 74 can be wired network interfaces, such as Ethernet interfaces, or wireless network interfaces, such as 802.11, BlueTooth, satellite-based interfaces, and the like. Partner network device 30b is similarly configured.

Other configurations are possible. For example, as discussed above, one or more physical network interfaces 73 or 74 may be omitted. In a less preferred embodiment, for example, if network interface 74 is omitted, copied packets can be transmitted between network devices 30a and 30b over LAN switches 23 via respective network interfaces 71. Still further, network device 30a may include more than two non-synchronization network interfaces. As FIG. 2F illustrates, network device 530a may include network interfaces 71a, 71b, 72a, and 72b. In such an embodiment, the synchronization packets transmitted to the partner network device are marked as discussed above with the network interface identifier corresponding to the network interface at which the original packet was received. In one embodiment, the network device 530a can be configured only to copy and transmit synchronization packets on a particular subset of its non-synchronization network interfaces.

According to an embodiment of the present invention, packets received from computer network 50 by network device 30a at network interface 72 are copied and transmitted to partner network device 30b from network interface 74. Similarly, partner network device 30b copies and transmits packets received from computer network 50 at its corresponding network interface 72 to network device 30a. Similarly, network device 30a copies and transmits packets received at network interface 71 to partner network device 30b via network interface 74. Network device 30a also receives, at network interface 74, packets copied and transmitted by network device 30b. In one embodiment, the partner network devices 30a, 30b do not copy and transmit as synchronization packets any multicast or broadcast packets.

In the embodiment discussed above, network devices 30a, 30b may exchange synchronization packets corresponding to packets received at network interfaces 71 and 72 over a single transmission line 99 or other connection, using a single network interface (e.g., 74) at each network device. In such an embodiment, the synchronization packets may take many forms. In one embodiment, the copied packets are overwritten in predetermined locations with state information, such as an identifier for the interface on which the packet was received, a packet receipt time, etc. This state information, in one embodiment, overwrites data not implicated in or affecting the network function performed by the network devices 30a, 30b. For example, certain state information, such as an interface identifier can be written into the checksum field of the packet header. In another embodiment, state information is written over the last N bytes of the packet. Overwriting data in the packets avoids the possibility of exceeding the maximum Message Transmission Unit (MTU) size associated with the data link layer protocol.

In other embodiments, however, the copied packets are encapsulated with synchronization headers. In one such embodiment, the synchronization packet headers can include a field identifying the network interface on which the packet was received (e.g., indicating whether the encapsulated packet was received at the outside or inside network interface). In one embodiment, the synchronization header includes a 4-byte signature field (including a magic number), an interface identifier, and optionally a time stamp. The 4-byte signature is intended to allow the network devices 30a, 30b to detect a possible configuration or connection error. That is, if the packets received on the synchronization interfaces do not include the appropriate magic number in the signature field, it is assumed that the synchronization interface has been improperly connected to another network device or network interface, rather than a synchronization interface associated with a partner network device. In such a circumstance, the network devices 30a, 30b are configured to report this error condition and terminate the synchronization functionality described herein.

According to embodiments of the present invention, packets received at synchronization network interfaces 73 and/or 74 are flagged as synchronization packets to allow network device 30a or 30b to distinguish between packets received directly by it or a partner device. As discussed more fully below, control module 75 processes regular and synchronization packets and, in one embodiment, discards packets flagged as synchronization packets. More specifically and in one embodiment, control module 75 processes a data flow originally encountered at a partner network device at a network interface (e.g., network interface 74) as if it were a normal data flow received directly at outside network interface 72. So, for example, the packets can influence measurement statistics, MIB variables, fill queues and other data structures, etc. However, the flagged synchronization packets associated with the data flow are discarded, as opposed to being released at inside network interface 71. Synchronization data flows traveling in the opposite direction received at synchronization interface 74 or synchronization interface 73 are processed in a similar manner.

In this manner, the packet synchronization functionality allows for substantially seamless failover support, since the state of the network devices 30a, 30b can be synchronized. For example, if network device 30a fails, network device 30b, armed with state information of data flows traversing network device 30a, can essentially begin processing the data flows at the point where network device 30a failed.

FIG. 5 illustrates, for didactic purposes, a method directed to the network traffic synchronization functionality described herein. The method described below uses magic numbers to identify configuration errors where the synchronization interface is physically connected to the wrong port of a partner network device or an entirely incorrect network device. As discussed herein, synchronization packets, in one embodiment, include magic numbers or other identifiers allowing for verification that the packets received are in fact synchronization packets from a partner network device. In one embodiment, the network device maintains a connection state which is set to OK if synchronization packets contain the appropriate magic identifier. Otherwise, a bad connection state flag is set to indicate a configuration error.

As FIG. 5 illustrates, assuming the connection state is OK (106), packets received at non-synchronization network interfaces (102, 104) are copied and, in one embodiment, encapsulated with a synchronization header identifying the network interface at which the packet was received (106). The encapsulated packet is then transmitted to a partner network device (108). If the bad connection state flag is set (106), no synchronization packets are copied and/or transmitted. As discussed below, the synchronization packets can be summarized versions of the original packets to, for example, conserve bandwidth. For example, in embodiments where only the packet headers are of interest, the payloads can be replaced with summary information such as payload size and any other relevant information. On the receiving end (see below), the summary information can be used to reconstruct versions of the packets before processing.

Packets received at a synchronization network interface (104), on the other hand, are verified, in one embodiment, using the magic number or other identifier appended to or overwritten into the packet (112). If the magic number is incorrect or not contained in the packet and the connection state flag has not been previously set (114), a configuration error is reported (116) and the bad connection state flag is set (118). In one embodiment, the packet is also discarded (119). In one embodiment, the configuration error is reported in an email to a network administrator. The configuration error may also reported in an SNMP trap or other suitable message to a network management platform. If the bad connection state flag has been previously set (114), the packet is discarded (119).

If the magic number is verified, the network device decapsulates and flags the packet as a synchronization packet (124). In addition, if the synchronization packet is a summary of the original packet, the packet is reconstructed using the summary information. For example, if the summary information indicates that the original packet had a 1300-byte payload, the packet is reconstructed to have a dummy payload of 1300 bytes. As FIG. 5 illustrates, the network device processes the packet, in one embodiment, as if it were a regular packet received at a non-synchronization network interface (126). In one embodiment, if the packet is flagged as a synchronization packet (128), the packet is discarded (130). Otherwise, the packet is emitted from the network device (132).

In another embodiment, whether the configuration errors are explicitly reported to a network administrator in an email, for example, is a configurable option. If the reporting option is not set, packets not including the requisite magic identifier can be simply discarded. In this instance, the network administrator can check for configuration errors by examining the MIB 138 which includes a variable that indicates the number of synchronization packets discarded on the interface 74. If the value is non-zero, a configuration error is likely.

B. Integration of Packet Synchronization Functionality into Bandwidth Management The following provides a detailed description of the packet synchronization functionality integrated into bandwidth management applications that monitor and/or control network traffic flowing across access links. One skilled in the art, however, will recognize that the packet synchronization functionality described herein may be integrated into a variety of network devices deployed in redundant configurations, such as proxies, firewalls, packet capture or network monitoring equipment, VPN servers, a web services network gateways or brokers, and the like. In addition, one skilled in the art will recognize that the packet synchronization functionality can be implemented in partner network devices that perform different network functions. For example, a first network device 30*a* may be a bandwidth management device, while a second network device 30*b* may be a packet sniffer or other data capture device.

As discussed above, intermediate network devices 30*a* and 30*b*, in one embodiment, can be bandwidth management devices operative to manage data flows traversing access links 21*a*, 21*b*. The above-identified, commonly-owned patents and patent applications disclose the functionality and operation of bandwidth management devices. As discussed herein, bandwidth management devices 30*a*, 30*b* are operative to classify data flows and, depending on the classification, enforce respective bandwidth utilization controls on the data flows to control bandwidth utilization across and optimize network application performance across access links 21*a*, 21*b*.

FIG. 3 is a block diagram illustrating functionality, according to one embodiment of the present invention, included in bandwidth management device 30. In one embodiment, bandwidth management device 30 comprises packet processor 131, flow control module 132, measurement engine 140, traffic classification engine 137, management information base (MIB) 138, and administrator interface 150. Packet processor 131 is operative to detect new data flows and construct data structures including attributes characterizing the data flow. Flow control module 132 is operative to enforce bandwidth utilization controls on data flows traversing bandwidth management device 30. Traffic classification engine 137 is operative to analyze data flow attributes and identify traffic classes corresponding to the data flows, as discussed more fully below. In one embodiment, traffic classification engine 137 stores traffic classes associated with data flows encountered during operation of bandwidth management device 30, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of bandwidth management device 30. Measurement engine 140 maintains measurement data relating to operation of bandwidth management device 30 to allow for monitoring of bandwidth utilization across access link 21 with respect to a plurality of bandwidth utilization and other network statistics on an aggregate and/or per-traffic-class level.

Administrator interface 150 facilitates the configuration of bandwidth management device 30 to adjust or change operational and configuration parameters associated with the device. For example, administrator interface 150 allows administrators to select identified traffic classes and associate them with bandwidth utilization controls (e.g., a partition, a policy, etc.), as well as configure parameters associated with partner bandwidth management devices. Administrator interface 150 also displays various views associated with a hierarchical traffic classification scheme and allows administrators to configure or revise the hierarchical traffic classification scheme. Administrator interface 150 can also be used to configure the traffic synchronization functionality described herein. Administrator interface 150 can be a command line interface or a graphical user interface accessible, for example, through a conventional browser on client device 42.

B.1. Packet Processing

In one embodiment, when packet processor 131 encounters a new data flow it stores the source and destination IP addresses contained in the packet headers in host database 134. Packet processor 131 further constructs a control block object including attributes characterizing a specific flow between two end systems. In one embodiment, packet processor 131 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Packet processor 131, in one embodiment, reserves memory space in the dynamic memory pool for storing such variably-sized attribute information as flows traverse bandwidth management device 30. Packet processor 131 writes the attributes in the dynamic memory pool and, if it runs out of memory, reports to the management information base 138 that it ran out of memory and returns the service type ID (see below) identified at the point when memory ran out.

Packet processor 131 also stores received packets in a buffer structure for processing. In one embodiment, the packets are stored in the buffer structure with a wrapper including various information fields. On such information field is a synchronization flag which is set for synchronization packets, as discussed more fully below. Other information fields can include the time the packet was received, and the packet flow direction (inbound or outbound).

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980, incorporated by reference herein, discloses classification of data flows for use in a packet-based communications environment. FIG. 1 illustrates the concept associated with inside and outside addresses. As discussed above, in one embodiment, a flow specification object includes an "inside" and "outside" address relative to bandwidth management device 30. See FIG. 1. For a TCP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow. As discussed above, in one embodiment, the control block object attributes further include a packet count corresponding to the number of packets associated with the flow to allow for such operations as the application of policies based on packet counts.

To allow for identification of service types (e.g., FTP, HTTP, etc.), packet processor 131, in one embodiment, is supported by one to a plurality of service identification tables in a relational database that allow for identification of a particular service type (e.g., application, protocol, etc.) based on the attributes of a particular data flow. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 30 encounters a new flow, packet processor 131 analyzes the data flow against the service attributes in the services table to identify a service ID corresponding to the flow. In one embodiment, packet processor 131 may identify more than one service ID associated with the flow. In this instance, packet processor 131 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor associates the flow with the most specific service ID. A traffic class may be configured to include matching rules based on the service IDs in the services table. For example, a matching rule directed to HTTP traffic may simply refer to the corresponding service ID, as opposed to the individual attributes that packet processor 131 uses to initially identify the service.

In one embodiment, when packet processor 131 inspects a flow it may detect information relating to a second, subsequent flow (e.g., an initial FTP command connection being the harbinger of a subsequent data connection, etc.). Packet processor 131, in response to such flows populates a remembrance table with attributes gleaned from the first flow, such as IP addresses of the connection end points, port numbers, and the like. Packet processor 131 scans attributes of subsequent flows against the remembrance table to potentially associate the subsequent flow with the first flow and to assist in identification of the second flow.

As to received synchronization packets, packet processor 131 is operative to strip the encapsulating synchronization headers, if any, from the packets and, in some embodiments, use the metadata in the encapsulating headers in place of other information, such as the time the packet was received, whether it is an inbound or outbound packet. Packet processor 131 is also operative to flag the packet as a synchronization packet. In one embodiment, packet processor 131 sets the synchronization flag in the wrapper associated with the packet maintained in the packet buffer structure. Otherwise, the packet processor 131, and the remaining modules associated with bandwidth management device 30, processes packets in a similar manner to regular data flows.

As discussed above, packet processor 131, in one embodiment, is also operative to copy and transmit packets to one or more partner bandwidth management devices. As discussed above, packet processor 131 is operative to copy packets received on outside interface 72 or inside interface 71, encapsulate the packets in synchronization headers, and transmit them to one or more partner bandwidth management devices, such as bandwidth management device 30b. As discussed above, in one embodiment, packet processor 131 is operative to overwrite certain packet information in the copied packets in addition to or in lieu of encapsulating the packets.

In one optimized embodiment, the synchronization packets may contain only part or a summary of the original packet. For example, at a given point in the classification of a data flow, in one embodiment, the traffic classification process ceases as to that flow, that is any packets corresponding to the flow are matched to the control block object without further classification. In one embodiment, once this classification process ceases, the synchronization packets may contain only part of the original packet and/or contain summary information. For example, in one embodiment, the synchronization packet includes the original packet header, but omits the payload, only including a payload size value. This configuration reduces the bandwidth requirements of the line between the network devices 30a, 30b.

B.2. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

B.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

B.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

B.2.c. Handling Synchronization Packets

As discussed above, synchronization packets are essentially treated like regular packets except that synchronization packets are discarded, in one embodiment, just prior to egress from inside or outside interface 71 or 72. In this manner, the synchronization packets can affect operation of flow control module 132 as the packets fill partition and other flow queues and are otherwise treated as normal packets. In other embodiments, however, the synchronization packets may be discarded at other points in the processing to achieve a variety of objectives. In one embodiment, synchronization packets are distinguished from regular packets by a flag set to indicate that the packet is a synchronization packet. In one embodiment, flow control module 132 is operative to check the state of the synchronization flag just prior to releasing the packet to other modules such as a network interface driver. In other embodiments, the network interface drivers can be configured to check for synchronization flags and discard flagged packets.

B.3. Traffic Classification

A traffic class comprises a set of matching rules or attributes allowing for logical grouping of data flows that share the same characteristic or set of characteristics—e.g., a service ID or type (see Section B.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, bandwidth management device 30 includes functionality allowing for classification of network traffic based on information from layers 2 to 7 of the OSI reference model.

In one embodiment, bandwidth management device 30 is configured to include a predefined set of traffic classes based upon a knowledge base gleaned from observation of common or known traffic types on current networks. Bandwidth management device 30, in one embodiment, also allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. Administrator interface 150, in one embodiment, also allows for the selection and arrangement of traffic classes into hierarchical reference trees.

Traffic classification database 137 stores traffic classes associated with data flows that traverse access link 21. Traffic classification database 137, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Bandwidth management device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification database 137 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.4. Measurement Engine and Management Information Base

Measurement engine 140 and management information base 138 maintain, among other things, data characterizing aspects of the operation of traffic classification database 137 to allow for an analysis of the performance of the traffic classification configuration associated with bandwidth management device 30.

Measurement engine 140 maintains data associated with the operation of bandwidth management device 30 and access link 21, including data allowing for measurement of bandwidth utilization across access link 21 with respect to a plurality of bandwidth utilization and other network statistics. For example, measurement engine 140 monitors the number of inbound and outbound packets, as well as the number of bytes, traversing bandwidth management device 30 on an aggregate (access link), partition, and/or traffic class level. Other network statistics can include the number of TCP packets, the number of retransmitted TCP packets, the peak number of active TCP flows or other connections, etc. Measurement engine 140 further maintains data relating to traffic classes, such as, for a given traffic class: the packet count in the traffic class, the TCP data packet count in the class, the TCP retransmit packet count in the class, and the peak number of active TCP flows in the class. Of course, measurement engine 140 can be configured to record and maintain a variety of network utilization and performance related data.

In one embodiment, measurement engine 140 monitors operation of bandwidth management device 30 and maintains values (e.g., packet counts, peak bandwidth utilization values, and other quantities) for various network operation, utilization and performance statistics. In one embodiment, measurement engine 140 maintains such values in volatile memory and, at periodic intervals, stores the data in persistent memory, such as a hard drive, with a time stamp and clears the network statistic values in the volatile memory space.

Management information base 138 maintains a database of standard and extended network objects maintaining counts and other statistics relating to the operation of bandwidth management device 30. In one embodiment, the data maintained by management information base 138 can be extracted using Simple Network Management Protocol (SNMP) queries. In one embodiment, management information base 138 is maintained in dynamic memory, such as Random Access Memory. For example, the management information base 138 maintains counts related to the operation of the inside and outside network interfaces associated with the bandwidth management device 30, such as the number of bytes transmitted from an interface, the number of bytes received on an interface, the number of queued packets, transmission error counts, etc. Management information base 138 also maintains counts related to the operation of different modules (e.g., packet processor 131, flow control module 132, etc.) included in bandwidth management device 30.

In one embodiment, the various statistics maintained by measurement engine 140 and management information base 138 can be divided into three main categories: 1) network statistics aggregated across regular data packets and synchronization data packets, 2) network statistics associated with regular data packets, and 3) network statistics associated with synchronization data packets. In one embodiment, both measurement engine 140 and the processes associated with management information base 138 can store or log data depending on the state of the synchronization flag associated with each packet to allow for the statistical categories above.

B.5. Enforcement of Bandwidth Utilization Controls

FIG. 4 illustrates a method, according to one embodiment of the present invention, directed to the enforcement of bandwidth utilization controls on data flows transmitted across access link 21 and, therefore, traversing bandwidth management device 30. The method for enforcing bandwidth utilization controls, however, is not critical to the present invention; any suitable method can be employed. As discussed herein, packet processor 131 treats packets received on inside and outside interfaces 71, 72 and the synchronization interface 74 (and possibly, inside synchronization interface 73) in essentially the same manner except for certain initial pre-processing steps. In one embodiment, packet processor 131 receives a data packet (FIG. 4, 202) and determines whether the packet is a synchronization packet (230). If the packet is a synchronization packet, packet processor decapsulates the packet and flags the packet as a synchronization packet (232). In one embodiment, packet processor 131 uses the meta information (such as receipt time, and flow direction), if any, in the synchronization packet header for use in the bandwidth management functionality described herein. If the packet is a regular packet, packet processor 131 copies the packet and encapsulates it in a synchronization header, in one embodiment, including meta information in certain header fields (234) and transmits it to any partner bandwidth management devices 30*b* (236). Otherwise, packets are processed as described below. In one embodiment, packet processor 131 determines whether flow database 135 contains an existing control block object corresponding to the data flow (204) (see Section B.1., supra). If no control block object corresponds to the data packet, packet processor 131 constructs a control block object including attributes characterizing the data flow, such as service type, etc. (212) (see above). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If a control block object is found, as FIG. 4 illustrates, packet processor 131 then determines whether the received packet is part of a new data flow (208) or represents a change to an existing data flow (see 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 5 minutes). If the difference between the time of the latest packet and the time of the last packet is greater than the threshold, the new packet is deemed part of a new flow. In some embodiments, packet processor 131 may have to encounter multiple packets to identify and fully characterize a new data flow (e.g., identify a service type, traffic class, etc.). For example, U.S. Pat. No. 6,046,980, identified above, discloses methods for classifying packet network flows.

If the data packet does not signify a new data flow, packet processor 131 retrieves the control block object, updates various attributes (e.g., last packet time, packet count, etc.), and associates the packet with the control block object (218). If elements of the data packet represent a change to the traffic type associated with the data flow (220), packet processor 131 passes the flow specification object to traffic classification engine 137 to identify a traffic class corresponding to the flow (214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the control block object (or a pointer to the control block object) to traffic classification engine 137. In one embodiment, the control block object or a copy of it is stored in association with the packet and in the same buffer structure to facilitate access to the control block object by traffic classification engine 137. As discussed in more detail below, traffic classification engine 137 operates on attributes of the control block object and/or flow specification object to identify traffic class(es) associated with the data flow (214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes.

Rate control module 132 then accesses the control block object corresponding to the data flow to retrieve the bandwidth utilization or other controls (e.g., partition, policy, security controls, etc.) associated with the traffic class and enforces the bandwidth utilization controls on the data packet flow (222). As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. In addition, measurement engine 140 records data associated with the packet (224) to allow for analysis of bandwidth utilization and other network statistics on a traffic class, access link, and/or partition level. In addition, as discussed above, measurement engine 140 can use the state of the synchronization flags to maintain network statistics based on synchronization packets only, regular data packets only, and both regular and synchronization packets.

As discussed above, rate control module 132, in one embodiment, is operative to discard packets flagged as synchronization packets prior to their egress from a network interface. In this manner, for example, bandwidth management devices 30*a*, 30*b* deployed in a redundant network environment can effect partitions on a network-wide basis, as the synchronization packets are placed in the queues or other data structures associated with the partitions. In addition, each bandwidth management device 30*a*, 30*b* can provide substantially seamless failover support since the state of each bandwidth management device is effectively synchronized. In other embodiments, the packets may be discarded at other points in the process. For example, if the policy associated with a packet is a per-flow rate control policy, the packet may be dropped at an earlier point in the process.

Lastly, although the present invention has been described as operating in connection with end systems and networks employing the HTTP, TCP and IP protocols, the present invention has application in computer network environments employing any suitable session layer, transport layer and network layer protocols. Moreover, while embodiments of the present invention have been described as operating in connection with bandwidth management devices, the present invention can also operate in connection with other network devices (such as routers, proxy servers, bridges, gateways, and firewalls) performing a variety of network functions. In addition, while the embodiments described above, exchange entire packets to synchronize network traffic data, partner network devices, in other embodiments, may exchange distilled versions of the packets or data characterizing selected attributes of the packets. Still further, while the embodiments described above copy and transmit synchronization packets upon receipt at a given network interface, the synchronization packets may be sent after the corresponding regular packets have been processed by the control module or other functionality. In addition, the deployment of the network devices 30*a*, 30*b* behind routers 22*a*, 22*b* is only one possible deployment configuration. Other deployment scenarios are possible. Still further, while the embodiments described above include a pair of interfaces for inside and outside network traffic, the present invention can be applied to a network device including additional network interfaces. In such an embodiment, the synchronization packets merely identify the network interface at which the original packet was received as described above. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus, comprising
one or more network interfaces;
a control module operative to
receive data packets on the one or more network interfaces, wherein the data packets are addressed to destination hosts;
receive synchronization packets from a partner network device;
transmit the data packets received on the one or more network interfaces as synchronization packets to the partner network device;
process the received data packets and the received synchronization packets to adjust one or more data objects that include state information for data flows corresponding to the received data packets and synchronization packets;
discard the received synchronization packets; and
forward the data packets received on the one or more network interfaces to the respective destination hosts.

2. The apparatus of claim 1 wherein the control module is further operative to encapsulate the data packets received on the communications path with synchronization headers before transmitting the data packets to the partner network device, and decapsulate the synchronization packets received from the partner network device.

3. The apparatus of claim 2 wherein the control module is further operative to include meta information relating to the data packets in the synchronization header.

4. A method comprising:
receiving data packets on one or more network interfaces, wherein the data packets are addressed to destination hosts;
receiving synchronization packets from a partner network device;
transmitting the data packets received on the one or more network interfaces as synchronization packets to the partner network device;
processing the received data packets and the received synchronization packets to adjust one or more data objects that include state information for data flows corresponding to the received data packets and synchronization packets;
discarding the received synchronization packets; and
forwarding the data packets received on the one or more network interfaces to the respective destination hosts.

5. The method of claim 4 further comprising encapsulating the data packets received on the communications path with synchronization headers before transmitting the data packets to the partner network device, and decapsulating the synchronization packets received from the partner network device.

6. The method of claim 5 further comprising including meta information relating to the data packets in the synchronization header.

* * * * *